United States Patent [19]

Murakami et al.

[11] Patent Number: 4,668,100

[45] Date of Patent: May 26, 1987

[54] ELECTRONIC EQUIPMENT WITH GEOMAGNETIC DIRECTION SENSOR

[75] Inventors: Tomomi Murakami, Higashimurayama; Hiroyuki Kihara, Kodaira; Kazuya Mitaki, Houya, all of Japan

[73] Assignee: Citizen Watch Co., Ltd., Tokyo, Japan

[21] Appl. No.: 902,992

[22] Filed: Sep. 2, 1986

[30] Foreign Application Priority Data

Sep. 3, 1985 [JP] Japan .............................. 60-194282
Mar. 18, 1986 [JP] Japan .............................. 61-59994
Apr. 15, 1986 [JP] Japan .............................. 61-86704

[51] Int. Cl.⁴ ..................... G04B 47/00; G04B 47/06; G01C 9/00
[52] U.S. Cl. ........................................ 368/10; 368/14; 33/354; 33/361
[58] Field of Search .................................... 368/10-11, 368/14, 20; 33/354, 361

[56] References Cited

U.S. PATENT DOCUMENTS 3,903,610  9/1975  Heaviside et al. ................. 33/361
4,337,530  6/1981  Toft, Jr. .............................. 368/14
4,482,255  11/1984  Gygax et al. ...................... 368/14
4,495,467  1/1985  Kuno et al. ................. 33/361 X R Primary Examiner—Vit W. Miska
Attorney, Agent, or Firm—Townsend and Townsend

[57] ABSTRACT

Electronic equipment has, in its case, a flux gate magnetic sensor with an excitation coil and a sensing coil wound around an annular magnetic core made of high permeability material, an integrated circuit including a magnetic field detector, cooperating with the magnetic sensor for detecting an external magnetic field and an operation circuit for operating the geomagnetic direction, a display device for displaying at least the geomagnetic direction, and a power source battery. The flux gate magnetic sensor is arranged along the inner surface of the case and the battery is arranged within the annular magnetic core of the magnetic sensor.

10 Claims, 15 Drawing Figures

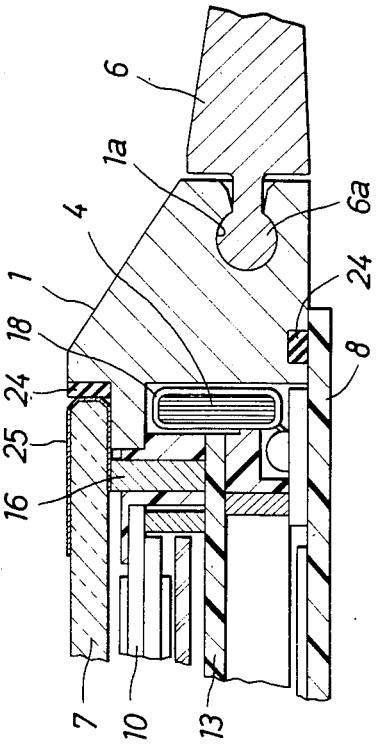
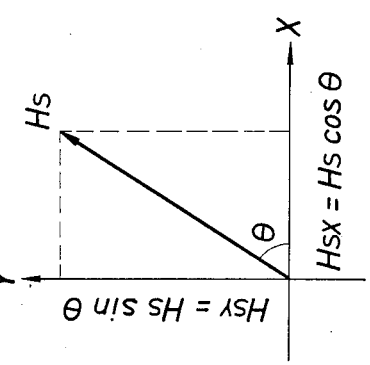

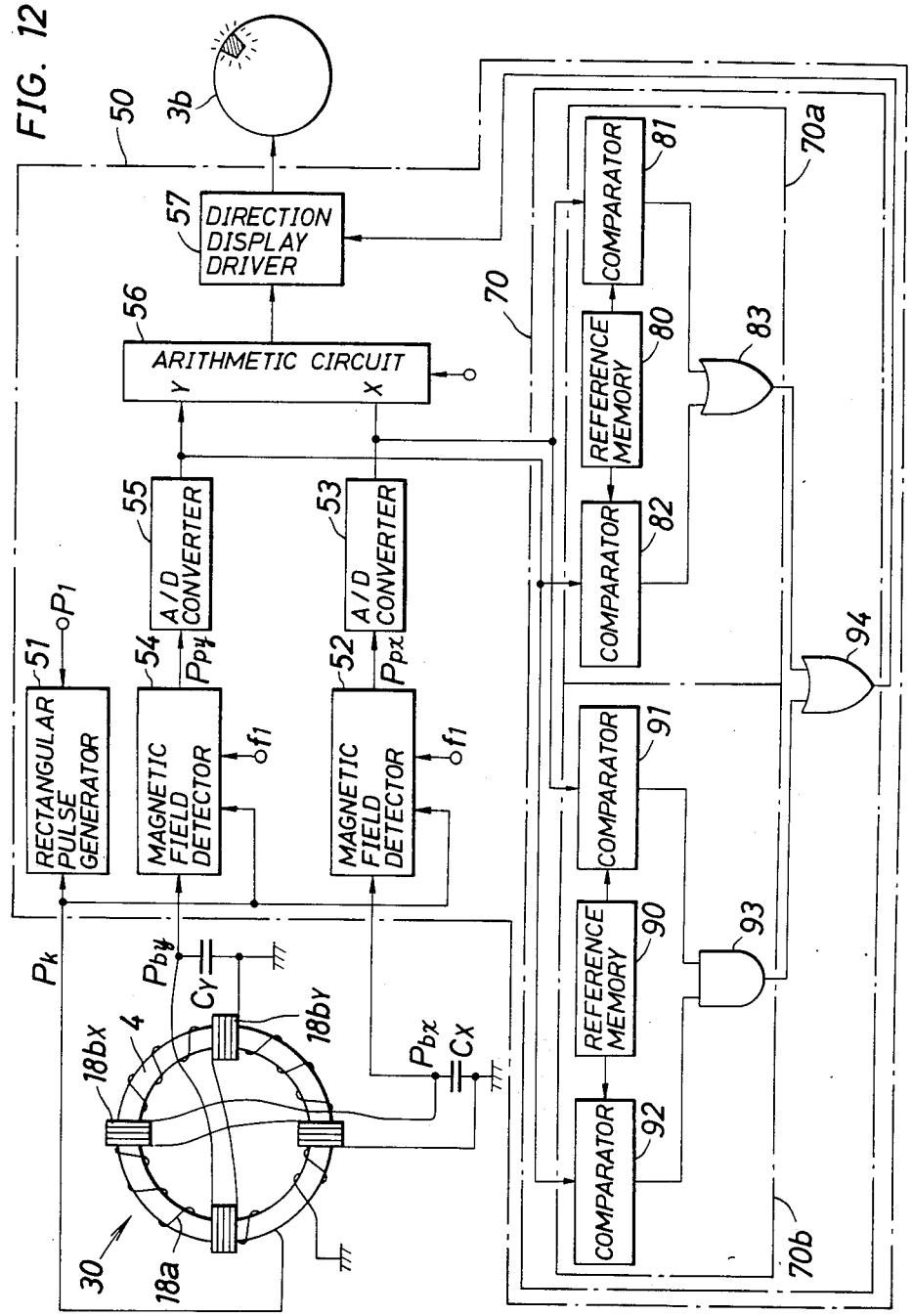

ELECTRONIC EQUIPMENT WITH GEOMAGNETIC DIRECTION SENSOR

BACKGROUND OF THE INVENTION

1. Field of the Invention

The present invention relates to an electronic equipment with a geomagnetic direction sensor and, more particularly, to an electronic equipment incorporating a flux gate magnetic sensor having low power consumption.

2. Description of the Prior Art

Electronic timepieces with a geomagnetic direction indicator have been known as conventional compact electronic equipment with a geomagnetic direction indicator. Such an electronic timepiece includes a compass for indicating a geomagnetic direction attached to a wristwatch band. The compass is separately mounted on the timepiece unit so that the overall arrangement is bulky. Unexamined Patent Publication (Kokai) No. 59-126285 filed by the present applicant describes an electronic timepiece incorporating a Hall element for electronically detecting a geomagnetic direction. However, geomagnetic sensitivity of the Hall element is not so good.

A flux gate magnetic sensor is known as a geomagnetic sensor having good sensitivity characteristics for electronically detecting geomagnetism (e.g., U.S. Pat. No. 3,903,610). The flux gate magnetic sensor is arranged such that an excitation coil and a sensing coil are wound around an annular magnetic core. An AC pulse signal is supplied to the excitation coil, and a signal extracted by a capacitor connected in parallel with the sensing coil is detected. The detected signal is then smoothed to obtain a DC voltage which represents a geomagnetic direction. This DC output is proportional to the cross-sectional area of the annular magnetic core. In order to produce a large output by using the flux gate magnetic sensor, the magnetic core must have a sufficiently large size and thickness. If the flux gate magnetic sensor is built into compact electronic equipment such as an electronic timepiece in association with other components, it is difficult to realize a compact system because of the spatial factor.

In a conventional direction sensor with a flux gate magnetic sensor, the period of the AC pulse signal supplied to the excitation coil must be shortened to increase the response time for direction indication, thus increasing power consumption.

Furthermore, the direction sensor using the flux gate magnetic sensor displays a wrong geomagnetic direction which is not associated with geomagnetism if a magnet having a magnetic field with a magnitude higher than that of geomagnetism is present near the magnetic field. In a location where geomagnetism is not detected, such as in a tunnel, the geomagnetism direction cannot be displayed, thus degrading reliability in use.

SUMMARY OF THE INVENTION

It is a first object of the present invention to provide compact electronic equipment with a geomagnetic direction sensor incorporating a flux gate magnetic sensor.

It is a second object of the present invention to provide electronic equipment with a geomagnetic direction sensor having low power consumption.

It is a third object of the present invention to provide electronic equipment with a geomagnetic direction sensor capable of generating a geomagnetic direction display error alarm.

The first object of the present invention is achieved by arranging a flux gate magnetic sensor along the inner surface of a case of electronic equipment, and by mounting a power source battery inside an annular magnetic core of the flux gate magnetic sensor.

The second object of the present invention is achieved by a rectangular excitation pulse signal generator for generating a rectangular excitation pulse signal as an excitation signal supplied to the excitation coil in the flux gate magnetic sensor, a timer operated to cause the rectangular pulses to serve as a period signal, and a sample/hold circuit operated in response to an output signal from the timer.

The third object of the present invention is achieved by arranging a direction error discriminator for comparing a level of a signal extracted by a sensing coil in the flux gate magnetic sensor with a predetermined level and for discriminating a direction display error.

BRIEF DESCRIPTION OF THE DRAWINGS

FIG. 2 is a sectional view showing an internal arrangement of the electronic timepiece with a geomagnetic direction sensor shown in FIG. 1;

FIG. 5 is a view for explaining a principle of direction calculation by a flux gate magnetic sensor;

FIG. 12 is a block diagram showing an arrangement of a geomagnetic direction indicator of the basic circuit shown in FIG. 3; and FIG. 13 is a partial sectional view showing another embodiment of an arrangement of the flux gate magnetic sensor in the electronic timepiece with a geomagnetic direction sensor according to the present invention.

DETAILED DESCRIPTION OF THE PREFERRED EMBODIMENTS

Figure 1:
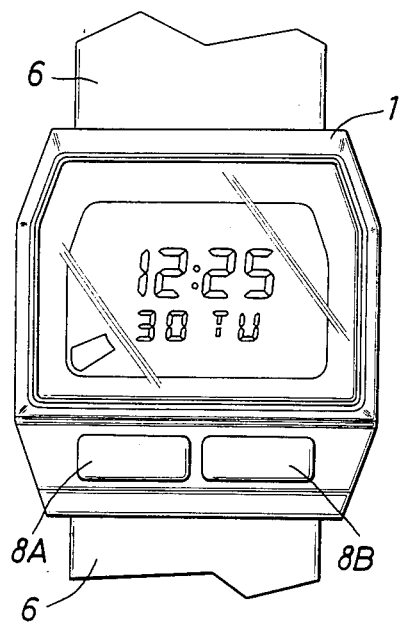
FIGS. 1(a), 1(b), and 1(c) are a front view showing the outer appearance of an electronic timepiece assembly, a view showing a display module of the electronic timepiece, and a view showing the electronic timepiece when a rear cover is removed, respectively, of an electronic timepiece with a geomagnetic direction sensor as an example of electronic equipment with a geomagnetic direction sensor according to the present invention.
Figure 1:
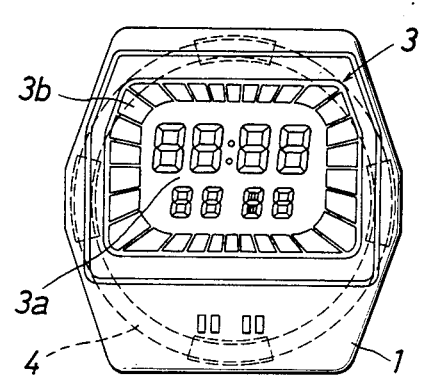
Figure 1:
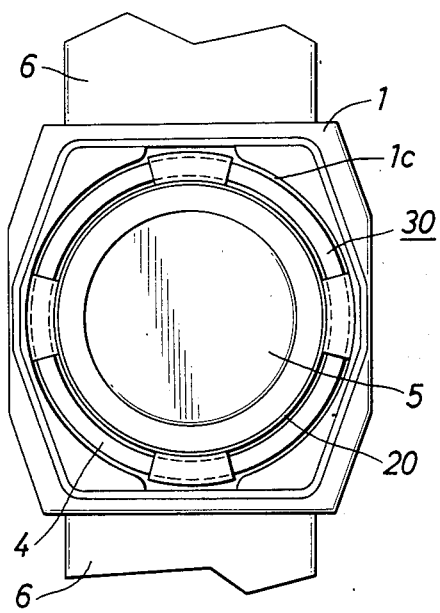

FIG. 1 shows the outer appearance of an electronic timepiece with a geomagnetic direction sensor according to the present invention. As shown in FIG. 1(a), a mode switching button 8A for switching between a time display mode and a geomagnetic direction display mode and a time correction button 8B are provided at the front of a timepiece case 1. A liquid crystal display device 3 is arranged at the center of the timepiece case 1 as shown in FIG. 1(b). A time display 3a consisting of numerals and characters for displaying a time, a date, and a day is provided at the center of the liquid crystal display device 3, and a direction display 3b consisting of a large number of segments is provided around the display 3a. When a rear cover of the timepiece case 1 is removed, as shown in FIG. 1(c), an annular magnetic core 4 of a flux gate magnetic sensor 30 is arranged in a space 1c, and a power source battery 5 is arranged inside the annular magnetic core 4.

A band 6 is detachably attached to the timepiece case 1. In order to attach the band, a recess 1a is formed in the timepiece case 1, and a projection 6a is formed at a distal end of the band 6 (see FIG. 2).

The internal configuration of the electronic timepiece according to the present invention will now be described with reference to FIG. 2.

A glass 7 is attached to the center of the front side of the timepiece case 1, and an operation button 8 of an elastic material is attached to a periphery thereof. The operation button 8 either the mode switching button 8A or the time correction button 8B shown in FIG. 1(a). On the other hand, a rear cover 9 is detachably attached to the rear side of the timepiece case 1. The band 6 and the rear cover 9 are made of a nonmagnetic material such as a plastic so as not to affect detection of geomagnetism.

Inside the timepiece case 1, a reflecting liquid cell 10 constituting the liquid crystal display 3 is arranged immediately below the glass 7, and a reflecting plate 11 is arranged just below it. The liquid cell 10 is supported by a support member 12 arranged along the inner surface of the timepiece case 1.

A circuit board 13 is fixed to the support member 12. A circuit element 14, such as an integrated circuit including a timer circuit and an arithmetic circuit for calculating a direction based on a result of detection of geomagnetism is mounted on the circuit board 13 and shielded with a protective molded body 15. The liquid cell 10 and the circuit board 13 are electrically connected by a connecting member 16 made of a conductive rubber. A switch pattern 17, which is turned on or off by a switch contact 8a of a conductive rubber provided below the operation button 8, is formed near a periphery (near the left end in the drawing) of the circuit board 13.

The annular magnetic core 4 of the flux gate magnetic sensor 30 for detecting a direction is arranged along the inner surface of the support member 12 (see (FIG. 1(c)). A coil 18 for excitation and detection is wound around the annular magnetic core 4, and a molded body 19 shields and protects the entire coil 18. Magnetic shielding plates 20 and 21 are provided at upper and inner surface sides of the annular magnetic core 4 so as to prevent an external magnetic field from affecting the coil 18. The magnetic shielding plates 20 and 21 are formed of a high permeability material such as a permalloy.

A terminal of the coil 18 for excitation and detection is electrically connected to the circuit element 14 through a circuit pattern 22 attached to the lower surface of the circuit board 13.

The battery 5 is supported by a support case 23 and housed in the timepiece case 1. Note that reference numeral 24 denotes a packing.

Figure 3:
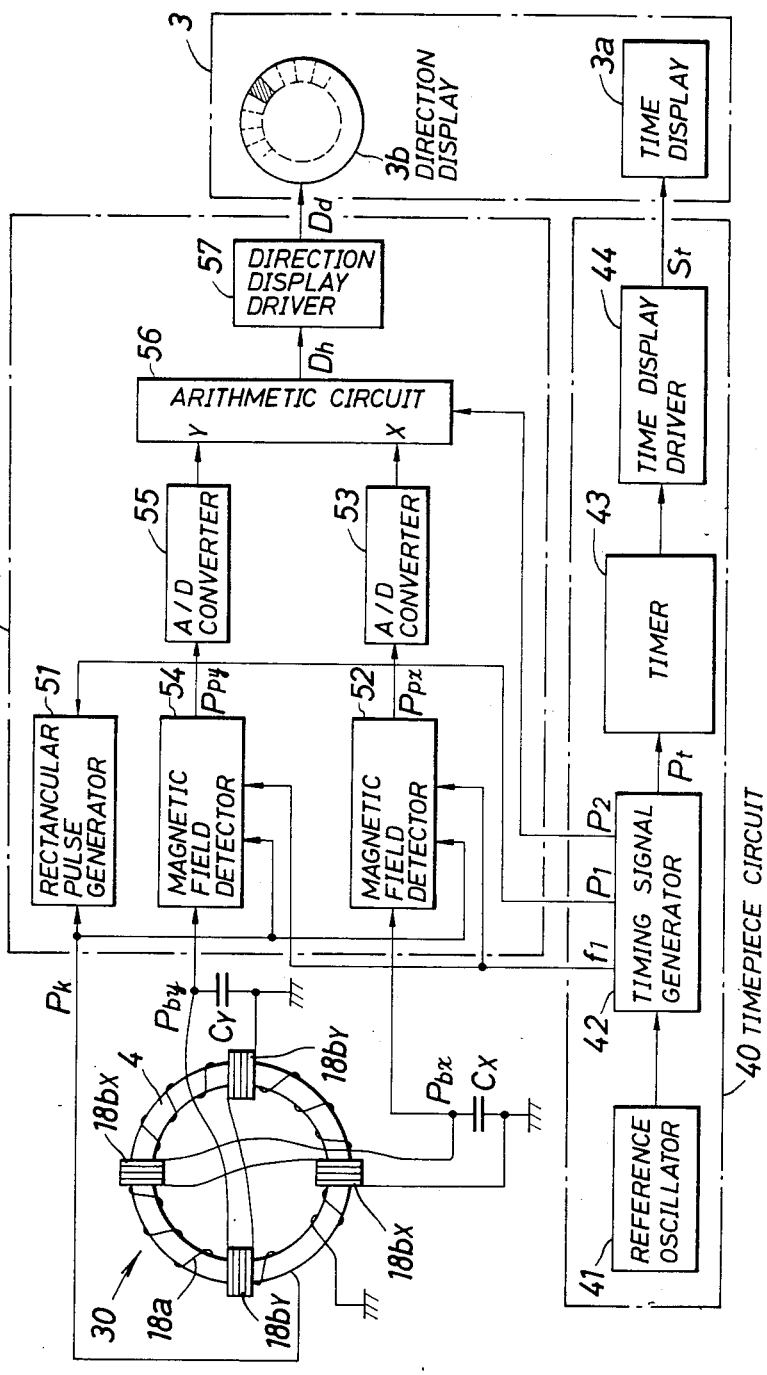
FIG. 3 is a basic block diagram of an electronic timepiece with a geomagnetic direction sensor as an embodiment of the present invention.

FIG. 3 shows a basic circuit configuration of the electronic timepiece with a direction sensor according to the present invention.

In the drawing, reference numeral 30 denotes a flux gate magnetic sensor in which an excitation oil 18a and a sensing coil 18b are toroidally wound around the annular magnetic core 4. The sensing coil 18b is divided into an X sensing coil 18bX and a Y sensing coil 18bY such that they are orthogonal to each other. Each sensing coil is divided in two diametrically separated portions on the annular magnetic core 4, and the two portions are electrically connected in series.

The principle of geomagnetic detection by the flux gate magnetic sensor 30 will be described below.

When a magnetic field $H_s$ generated by the geomagnetism as shown in FIG. 5 is present, X and Y components $H_{sx}$ and $H_{sy}$ at intersections of the magnetic field $H_s$ and the X and Y sensing coils 18bX and the 18bY, respectively, are as follows;

$$H_{sx} = H_s \cos 74 , \ H_{sy} = H_s \sin 74$$

These geomagnetic X and Y components $H_{sx}$ and $H_{sy}$ are respectively output at terminals of capacitors $C_X$ and $C_Y$ connected in parallel with the X and Y detection coils 18bX and 18bY as an X-component signal $P_{bx}$ and a Y-component signal $P_{by}$ by an excitation signal supplied to the excitation coil 18a.

Voltage levels of X- and Y-component signals $P_{bx}$ and $P_{by}$ of the geomagnetism are proportional to magnitudes of X and Y components $H_{sx}$ and $H_{sy}$ of the magnetic field $H_s$.

A timepiece circuit 40 has a conventional circuit configuration and consists of a reference oscillator 41 consisting of a quartz oscillator or the like, a timing signal generator 42 for frequency-dividing a reference signal output from the reference oscillator 41 and generating a "second" signal $P_t$, and timing signals $P_1$, $P_2$, and $f_1$ required for time display, a timepiece circuit 43 for generating a "minute" signal and an "hour" signal based on the "second" signal $P_t$, and a time display driver 44 for outputting a time display signal based on the "second", "minute", and "hour" signals from the timepiece circuit 43.

A direction indicator circuit 50 for displaying a direction consists of a rectangular pulse generator 51 for generating a rectangular excitation pulse signal $P_K$ for exciting the flux gate magnetic sensor 30 based on the timing signal $P_1$ output from the timing signal generator 42 of the timepiece circuit 40, a magnetic field detector 52 for detecting the X-component signal $P_{bx}$ of the geomagnetism extracted through the capacitor $C_X$ connected in parallel with the Y sensing coil 18bX, an A/D converter 53 for A/D converting an output signal $P_{px}$ from the magnetic field detector 52, a magnetic field detector 54 for detecting the Y-component signal $P_{by}$ of the geomagnetic signal extracted through the capacitor $C_Y$ connected in parallel with the Y sensing coil 18bY, an A/D converter 55 for converting an output signal $P_{py}$ from the magnetic field detector 54, an arithmetic circuit 56 for calculating a direction from the X- and Y-component signals $P_{bx}$ and $P_{by}$ of the geomagnetism at a period of the timing signal $P_2$ and generating direction data, and a direction display driver 57 for outputting a direction display signal based on the direction data.

The magnetic field detector 52 consists of a wave detector for detecting the X-component signal $P_{bx}$ of the geomagnetism and a smoothing circuit for smoothing a wave detected output, and the magnetic field detector 54 has the same configuration.

Figure 4:
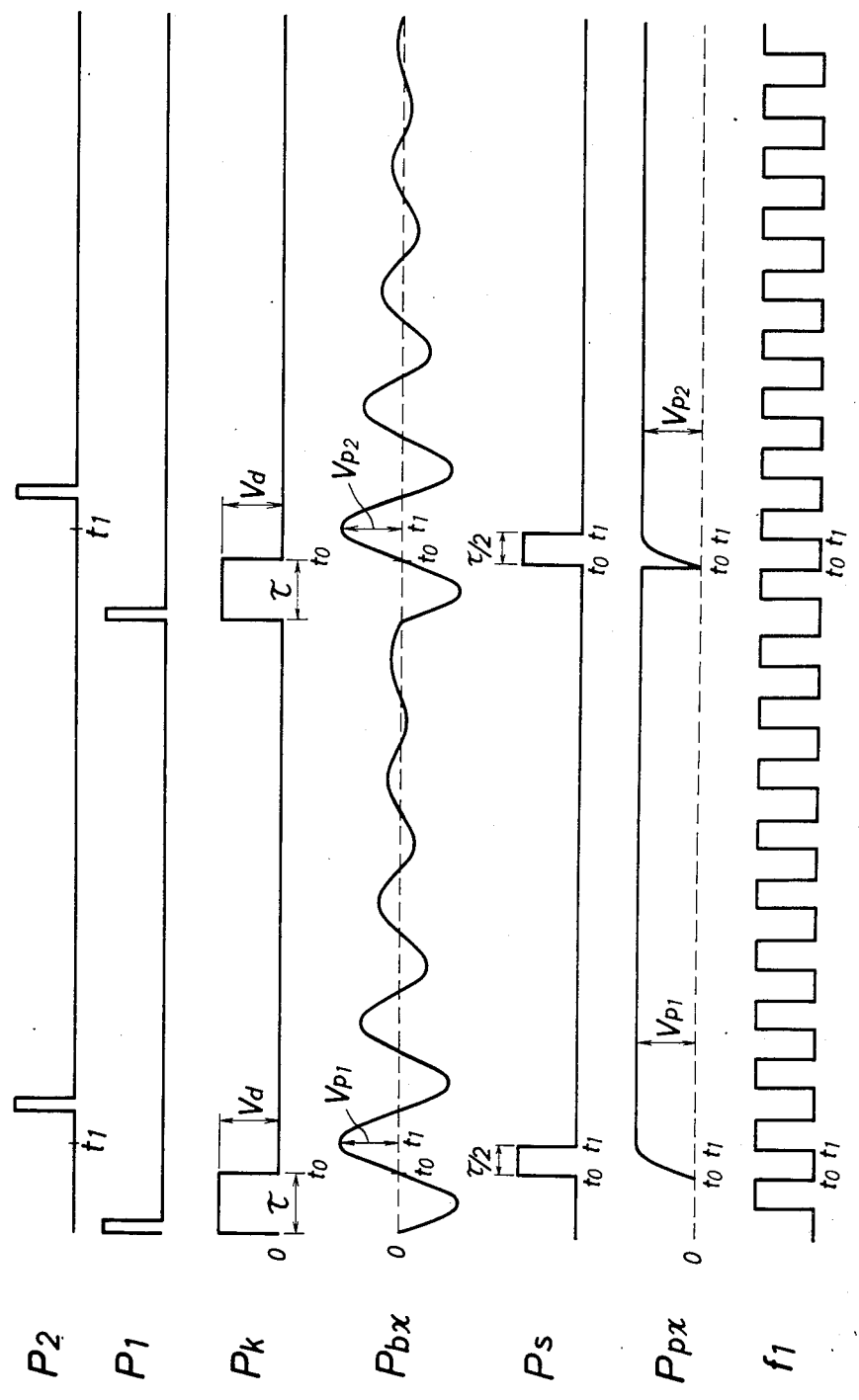
FIG. 4 is a timing chart of a signal at each block of the basic circuit shown in FIG. 3.

FIG. 4 shows the relationship over time between the timing signals $P_1$, $P_2$, and $f_1$ generated by the timing signal generator 42, the rectangular excitation pulse signal $P_K$ generated by the direction indicator circuit 50, the X-component signal $P_{bx}$, and the output signal $P_{px}$ from the magnetic field detector 52.

The liquid crystal display device 3 consists of a time display $3a$ for displaying a date, a day, and a time based on a time display signal $S_t$ output from the timepiece circuit 40 and a direction display $3b$ for displaying a direction based on a direction display signal $D_d$ output from the direction indicator circuit 50.

Operations of the electronic timepiece with a direction sensor having the above basic circuit configuration will be described below with reference to FIG. 4.

In a manner similar to a conventional electronic timepiece, in the time display mode, a calendar signal is generated as well as a "minute" signal and an "hour" signal by the timer 43 based on the "second" signal $P_t$ frequency-divided and generated by the timing signal generator 42, a time display signal $S_t$ is generated based on these signals by the time display driver 44. A date, a day, and a time based on the time display signal $S_t$ are displayed on the time display $3a$ of the liquid crystal display device 3.

In the direction display mode, a rectangular pulse generator 51 of a direction indicator 50 is triggered at a period of the timing signal $P_1$ to generate a rectangular excitation signal $P_K$ which is supplied to the excitation coil $18a$ of the flux gate magnetic sensor 30. As a result, the X- and Y-component signals $P_{bx}$ and $P_{by}$ of the geomagnetism as shown in FIG. 4 are obtained from the X and Y sensing coils $18_{bX}$ and $18_{bY}$ (only $P_{bx}$ is shown in FIG. 4).

The magnetic field detectors 52 and 54 detect and smooth the X- and Y-component signals $P_{bx}$ and $P_{by}$ of the geomagnetism to output signals $P_{bx}$ and $P_{by}$ of a peak value $V_{p1}$. The signals $P_{px}$ and $P_{py}$ are A/D converted by the A/D converters 53 and 55 and then supplied to the arithmetic circuit 56.

The arithmetic circuit 56 calculates a direction $\theta$ at a period of the timing signal $P_2$ as follows and outputs direction data $D_h$.

$$\tan\theta = H_s\sin\theta/H_s\cos\theta = P_{py}/P_{px}$$

The direction display driver 57 outputs a direction display signal $D_d$ based on the direction data $D_h$ output from the arithmetic circuit 56, and the direction is displayed on the direction display $3b$ of the liquid crystal display device 3.

Figure 6:
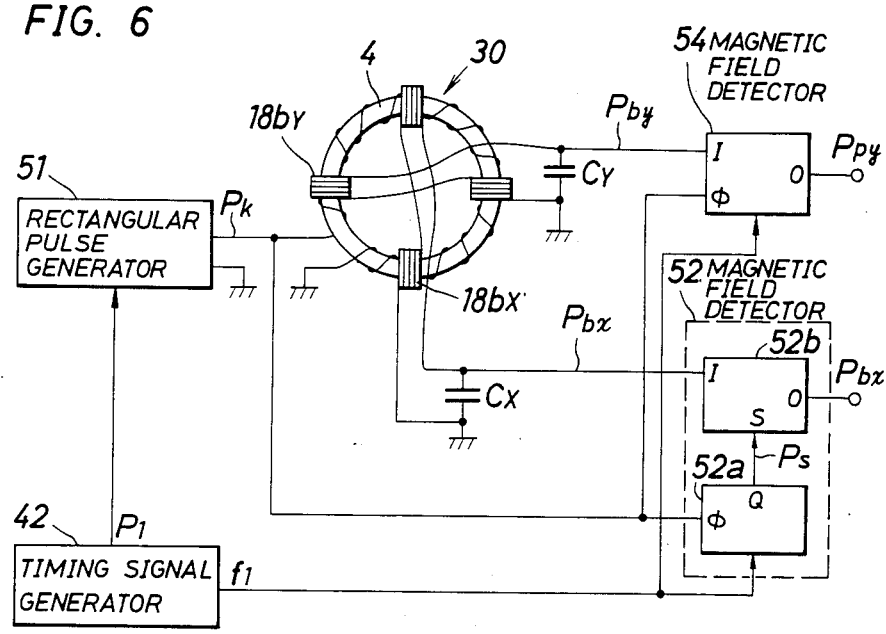
FIG. 6 is a circuit diagram showing an embodiment mainly of a magnetic field detector of the basic circuit shown in FIG. 3.

FIG. 6 shows an embodiment of the electronic timepiece with a sensor having a low power consumption according to the present invention. In FIG. 6, only an essential part is illustrated, and the same reference numerals as in FIG. 3 denote the same parts.

In this embodiment, the magnetic field detector 52 consists of a timer $52a$ and a sample/hold circuit $52b$, and the magnetic field detector 54 similarly consists of a timer and a sample and hold circuit. Since the magnetic field detectors 52 and 54 have the same circuit configuration and operation, however, only the magnetic field detector 52 will be described below.

Figure 7:
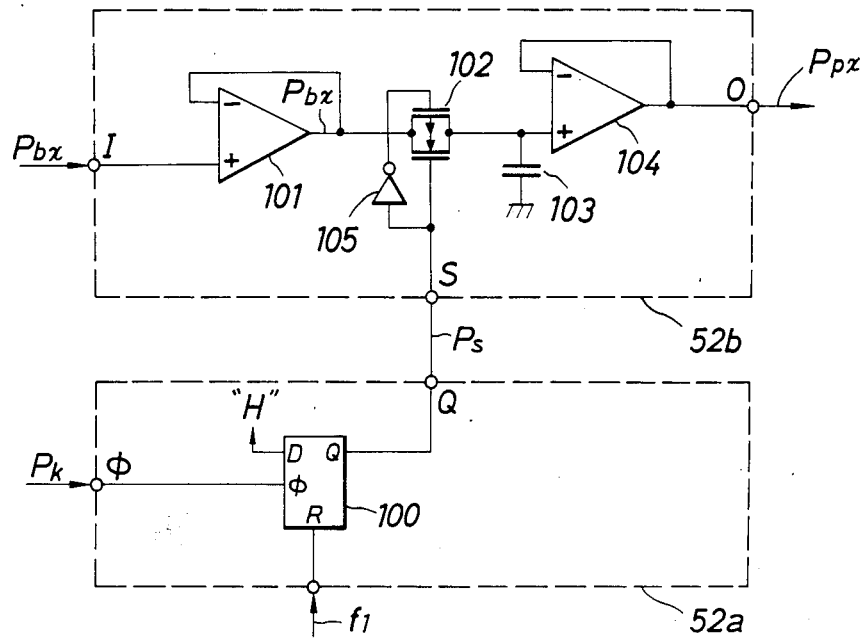
FIG. 7 is a circuit diagram showing an arrangement of the magnetic field detector in detail shown in FIG. 6.

FIG. 7 shows the timer $52a$ and the sample/hold circuit $52b$ constituting the magnetic field detector 52 in detail. As shown in FIG. 7, the timer $52a$ consists of a D flip-flop 100 which outputs a sample control signal $P_s$ of a predetermined duration (a time corresponding to ½ of a pulse width $\tau$ of the signal $P_K$) from a trailing edge ($t_0$) of a rectangular excitation pulse signal $P_K$ from the rectangular pulse generator 51. The sample/hold circuit $52b$ consists of a buffer amplifier 101 for receiving the X-component signal $P_{bx}$ of the geomagnetism output from the sensing coil of the magnetic sensor 30 at its non-inverting input terminal, a transmission gate 102 turned on or off by an output $P_s$ of the timer $52a$, a capacitor 103, a buffer amplifier 104 having an anti-discharge function for the capacitor 103, and an inverter 105 connected to the transmission gate 102. Note that the buffer amplifiers 101 and 104 may have an amplifying function.

The operation of the magnetic field detector 52 will be described with reference to the timing chart in FIG. 8.

When the timer $52a$ receives the rectangular excitation pulse signal $P_K$, the D flip-flop 100 reads data "H" applied to its D terminal at a trailing edge $t_0$ of the signal $P_K$ and outputs the sample control signal $P_s$ from its Q terminal. Since the sample control signal $P_s$ is reset to "L" at a leading edge $t_1$ of the timing signal $f_1$ input to the reset terminal R of the flip-flop 100, the pulse width of the signal $P_s$ becomes $\tau/2$ ($\tau$ is a pulse width of the rectangular excitation pulse signal $P_K$).

Figure 8:
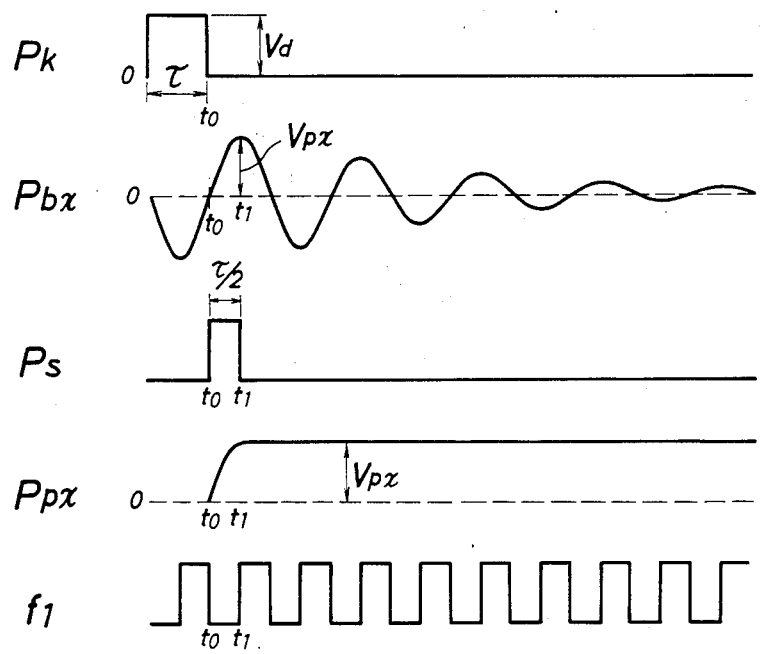
FIG. 8 is a timing chart of a signal at each block of the circuit shown in FIG. 7.

On the other hand, since the X-component signal $P_{bx}$ of the geomagnetism is supplied to the sample and hold circuit $52b$ as shown in FIG. 8, the transmission gate 102 is opened and the X-component signal $P_{bx}$ of the geomagnetism is passed to charge the capacitor 103 while the sample control signal $P_s$ is at level "H". Since the transmission gate 102 closes at $t_1$ when the sample control signal $P_s$ goes to level "L", a voltage value of the capacitor 103 becomes the output $P_{px}$ of the magnetic field detector 52. Thereafter, the X-component signal $P_{bx}$ of the geomagnetism decreases. However, the output $P_{px}$ of the magnetic field detector 52 is maintained at a peak value $V_{px}$ of the X-component signal $P_{bx}$ of the geomagnetism till the next rectangular excitation pulse signal $P_K$ is output, as shown in FIG. 8. The peak value $V_{px}$ is proportional to the X component $H_{sx}$ of an external magnetic field internsity $H_s$.

The other magnetic field detector 54 operates similarly, and the peak value $V_{py}$ of the Y-component signal $P_{by}$ of the geomagnetism is continuously output from the magnetic field detector 54. The arithmetic circuit 56 calculates the direction using the peak values of the outputs $P_{px}$ and $P_{py}$ from the magnetic field detectors 52 and 54 and $V_{px}$ and $V_{py}$.

Therefore, the detection signal of the geomagnetism at a given moment is maintained and the direction can be calculated by applying a rectangular excitation pulse signal $P_K$ to the excitation coil $18a$ of the magnetic sensor 30 once, resulting in low power consumption.

Figure 9:
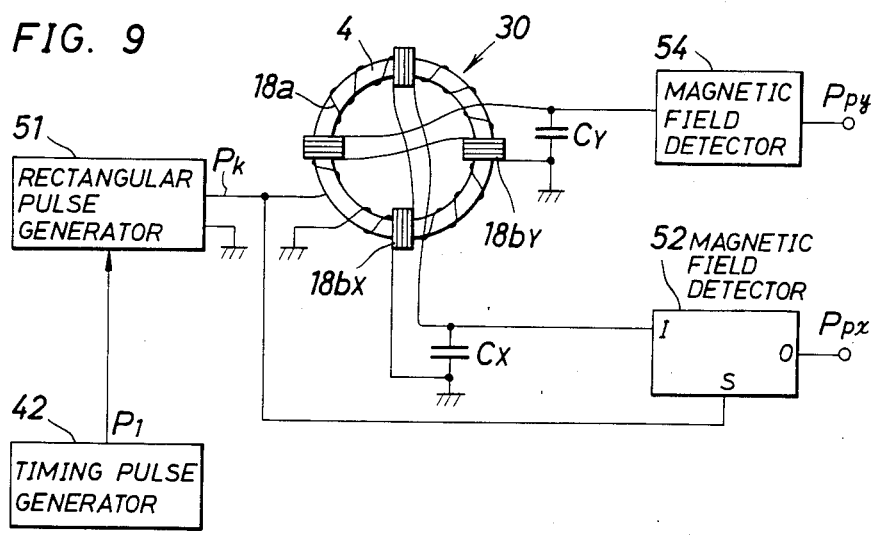
FIG. 9 is a circuit diagram showing another embodiment mainly of the magnetic field detector of the basic circuit shown in FIG. 3.

FIG. 9 shows a second embodiment of the electronic timepiece with a direction sensor having a low power consumption according to the present invention. In FIG. 9, the same reference numerals as in FIG. 6 denote the same parts.

Figure 10:
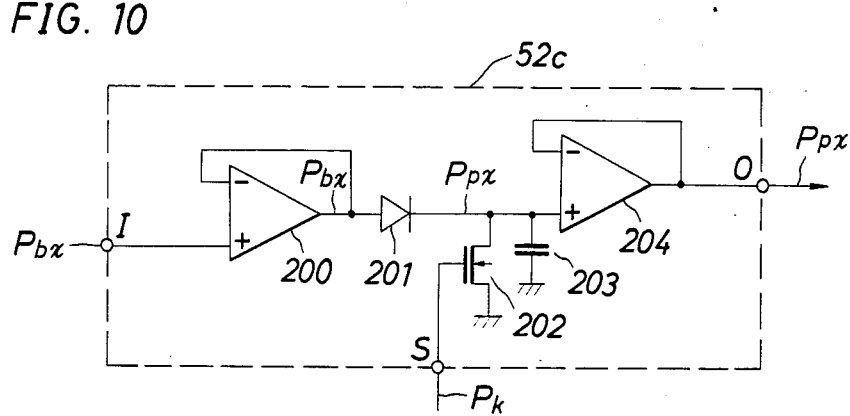
FIG. 10 is a circuit diagram showing an arrangement of the magnetic field detector in detail shown in FIG. 9.

In this embodiment, the magnetic field detector 52 or 54 consists of a peak hold circuit as shown in FIG. 10.

A peak hold circuit 52c consists of a buffer amplifier 200 for receiving the X-component signal $P_{bx}$ of the geomagnetism at its non-inverting input terminal and inpedance converting and outputting it, a diode 201, a switch 202 which is turned on upon reception of the rectangular excitation pulse signal $P_K$ and consists of an N channel MOS, a capacitor 203, and a buffer amplifier 204 having an anti-discharge function for the capacitor 203. Note that the buffer amplifiers 200 and 204 may have an amplifying function.

Figure 11:
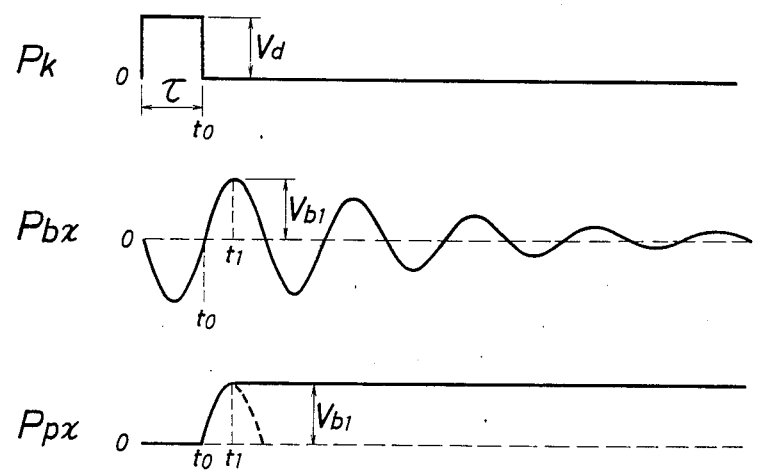
FIG. 11 is a timing chart of a signal at each block of the circuit shown in FIG. 10.

An operation of the magnetic field detector will be described with reference to the timing chart shown in FIG. 11.

Since the switch 202 is turned on when the peak hold circuit 52c receives the rectangular excitation pulse signal $P_K$, the capacitor 203 is short circuited and initialized. The switch 202 is turned off at the trailing edge $t_0$ of the signal $P_K$, so that the X-component signal $P_{bx}$ of the geomagnetism input to the buffer amplifier 200 charges the capacitor 203 through the buffer amplifier 200 and the diode 201. A terminal voltage of the capacitor 203 increases as the X-component signal $P_{bx}$ increases. When the terminal voltage reaches the peak value $V_b$ and begins to decrease, it is interrupted by the diode 201, so that the peak valuve $V_{b1}$ of the $P_{bx}$ is maintained at the capacitor 203. The peak value $V_{b1}$ becomes an output of the buffer amplifier 204, i.e., the output $P_{px}$ of the peak hold circuit 52c.

Another magnetic field detector 54 shown in FIG. 9 operates similarly, and the direction can be calculated by the arithmetic circuit using the outputs $P_{px}$ ($=V_{b1}$) and $P_{py}$ ($=V_{b2}$). Similar to the embodiment of FIG. 6, the rectangular excitation pulse signal $P_K$ need be supplied only once to calculate the direction in this embodiment, thereby reducing power consumption.

FIG. 12 shows a third embodiment of the electronic timepiece with a direction sensor having a direction error alarm function according to the present invention, wherein the same reference numerals as in FIG. 3 denote the same parts.

In this embodiment, a direction error discriminator 70 for discriminating whether the detected level of the geomagnetism falls within a predetermined range is provided in the direction indicator 50 of the basic circuit shown in FIG. 3.

The direction error discriminator 70 consists of a first direction level discriminator 70a for discriminating that the detected geomagnetism is larger than a predetermined level and a second direction level discriminator 70b for discriminating that the detecting geomagnetism is smaller than a predetermined level, and outputs a direction error signal when the detected geomagnetic level falls outside the predetermined range.

The first direction level discriminator 70a consists of a reference memory 80 for storing a magnetic level $M_1$ which is significantly larger than the geomagnetism, a digital comparator 81 for comparing an A/D converted value of the output $P_{px}$ of the magnetic field detector 52 with the magnetic level $M_1$, a digital comparator 82 for comparing an A/D converted value of the output $P_{py}$ of the magnetic field detector 54 with the magnetic level $M_1$, and an OR gate 83 for taking a logical sum of the outputs of the two comparators 81 and 82. The second direction level discriminator 70b consists of a reference memory 90 for storing a magnetic level $M_2$ which is significantly smaller than the geomagnetism, a digital comparator 91 for comparing an A/D converted value of the magnetic field detector 52 with the magnetic level $M_2$, a digital comparator 92 for comparing an A/D converted value of the $P_{py}$ of the magnetic field detector 54 with the magnetic level $M_2$, and an AND gate for taking a logical product of the outputs of the comparators 91 and 92.

Reference numeral 94 denotes an OR gate for taking a logical sum of the outputs of the first and second direction level discriminators 70a and 70b.

The X and Y components $H_{sx}$ and $H_{sy}$ of the geomagnetism detected by the magnetic sensor 30 are input to the direction level discriminators 70a and 70b and then compared with the magnetic levels $M_1$ and $M_2$ stored in the reference memory by each discriminator. When one of the X and Y components $H_{sx}$ and $H_{sy}$ is larger than the magnetic level $M_1$, a signal of "H" level is output from the first direction level discriminator 70a, and when both of the components are smaller than the magnetic level $M_2$, a signal of "H" level is output from the second direction level discriminator 70b. The former occurs when, e.g., a magnet is near the electronic timepiece, and the latter occurs when, e.g., detection is performed in a tunnel.

Anyway, when a signal of "H" level is output as a direction error signal from the first or second direction level discriminator 70a or 70b, the signal is supplied to the direction display driver 57 to display a direction error alarm of the direction display 3b. The direction error alarm may be performed either by erasing or flashing the direction pattern which has been displayed, or by illuminating a direction error mark. An alarm may be provided by, e.g., a buzzer instead of using a liquid crystal display device 3.

With this direction error alarm, reliability of the direction sensor can be improved.

FIG. 13 is an embodiment showing another arrangement different from that of the embodiment shown in FIG. 2 of the electronic timepiece with a sensor device according to the present invention, wherein the same parts as in FIG. 2 are denoted by the same reference numerals.

In this embodiment, a touch switch 25 is employed instead of the operation button of the embodiment shown in FIG. 2, and the annular magnetic core 4 of the flux gate magnetic sensor is flat. The touch switch 25 consists of a conductive electrode continuously formed on the upper and lower surfaces of the glass 7 using a technique such as deposition. When a user touches a part of the electrode with his finger, a switch signal is supplied to the circuit board 13 through the conductive connecting member 16, thereby performing mode switching or time correction.

What is claimed is:

1. Electronic equipment comprising a case, a flux gate magnetic sensor with an excitation coil and a sensing coil wound around an annular magnetic core made of high permeability material, an integrated circuit including a magnetic field detector operably connected with said magnetic sensor for detecting an external magnetic field and an operation circuit operably connecting said magnetic sensor and said integrated circuit for determining geomagnetic direction, a display device for displaying at least the geomagnetic direction, and a power source battery;

wherein said flux gate magnetic sensor is arranged along an inner surface of said case and said battery is arranged within said annular magnetic core of said magnetic sensor.

2. Electronic equipment according to claim 1, wherein a magnetic shielding plate is arranged between said flux gate magnetic sensor and said battery.

3. Electronic equipment according to claim 1, wherein a module including said integrated circuit and said display device is arranged within said annular magnetic core of said flux gate magnetic sensor.

4. Electronic equipment according to claim 1, wherein an operation member is provided at a display surface side or a rear cover side of said case except a side portion where said flux gate magnetic sensor is disposed.

5. Electronic equipment according to claim 1, wherein said integrated circuit includes a direction indicator having an excitation signal generator for generating an excitation signal which is supplied to an excitation coil of said flux gate magnetic sensor, a pair of magnetic field detectors for detecting external magnetic field signals generated at two sensing coils, and an operation circuit for calculating direction data based on the signal from said pair of magnetic field detectors.

6. Electronic equipment according to claim 5, wherein said excitation signal generator is a rectangular pulse generator for generating a rectangular pulse, and said magnetic field detector comprises a timer circuit arranged to operate with said rectangular pulse as a synchronizing signal and a sample/hold circuit arranged to operate with an output signal of said timer circuit.

7. Electronic equipment according to claim 5, wherein said excitation signal generator is a rectangular pulse generator for generating a rectangular pulse, and said magnetic field detector is a peak hold circuit for performing a detection operation using said rectangular pulse as a synchronizing signal.

8. Electronic equipment according to claim 5, further comprising a direction error discriminator for comparing a signal level from said magnetic field detector with a predetermined level to output a direction error signal and providing a direction error alarm according to said direction error signal.

9. Electronic equipment according to claim 8, wherein said direction error discriminator has a first direction level discriminator for discriminating that an external magnetic field signal generated at said sensing coil is larger than the geomagnetic level as normally detected.

10. Electronic equipment according to claim 8, wherein said direction error discriminator has a second direction level discriminator for discriminating that external magnetic field signals generated at said two sensing coils are smaller than the geomagnetic level as normally detected.

* * * * *